United States Patent
Lucht et al.

(10) Patent No.: US 12,284,718 B1
(45) Date of Patent: Apr. 22, 2025

(54) SYSTEM AND METHODS FOR CONTROLLING WIRELESS DEVICE FUNCTIONALITY WHEN CONNECTED TO ROAMING NETWORKS

(71) Applicant: T-Mobile USA, Inc., Bellevue, WA (US)

(72) Inventors: Thomas P. Lucht, Seattle, WA (US); Grant M. Castle, Bellevue, WA (US); Nilesh Ranjan, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/919,337

(22) Filed: Oct. 17, 2024

(51) Int. Cl.
*H04W 8/12* (2009.01)
*H04W 52/02* (2009.01)
*H04W 64/00* (2009.01)

(52) U.S. Cl.
CPC ......... *H04W 8/12* (2013.01); *H04W 52/0209* (2013.01); *H04W 64/00* (2013.01)

(58) Field of Classification Search
CPC ..... H04W 12/06; H04W 12/088; H04W 4/12; H04W 4/14; H04W 4/16; H04W 4/24; H04W 12/50; H04W 88/02; H04W 88/184
USPC ...................... 455/466, 566, 413, 414.1, 415
See application file for complete search history.

(56) References Cited

U.S. PATENT DOCUMENTS

| | | | |
|---|---|---|---|
| 6,463,390 B1 * | 10/2002 | Miyamori | G10H 1/0008 702/68 |
| 7,133,670 B1 | 11/2006 | Moll et al. | |
| 7,151,931 B2 | 12/2006 | Tsao et al. | |
| 7,349,695 B2 | 3/2008 | Oommen et al. | |
| 7,603,119 B1 | 10/2009 | Durig et al. | |
| 7,702,329 B1 | 4/2010 | Durig et al. | |
| 7,792,526 B2 | 9/2010 | Salomone | |
| 7,805,140 B2 | 9/2010 | Friday et al. | |
| 8,219,081 B2 | 7/2012 | Kondo | |
| 8,301,136 B2 | 10/2012 | Kim et al. | |
| 8,340,020 B2 * | 12/2012 | Gan | H04Q 3/0045 370/328 |

(Continued)

FOREIGN PATENT DOCUMENTS

| | | |
|---|---|---|
| CN | 102244857 A | 11/2011 |
| CN | 108449767 A | 8/2018 |

(Continued)

*Primary Examiner* — Joseph Arevalo
(74) *Attorney, Agent, or Firm* — Perkins Coie LLP

(57) ABSTRACT

The system receives, from a telecommunications network subscribed to by the wireless device, a list of roaming networks. The system connects to a roaming network from the list of roaming networks. The system enters a roaming mode from a standard mode. The roaming mode reduces the amount of data used by the wireless device by preventing the wireless device from performing background tasks. Background tasks include processes performed by the wireless device to keep an application on the wireless device up to date. The standard mode causes the wireless device to operate at a higher data level and a less optimized battery level compared to the roaming mode. The system connects to the telecommunications network. The wireless device disconnects from the roaming network before connecting to the telecommunications network subscribed to by the wireless device. The system enters the standard mode.

20 Claims, 6 Drawing Sheets

(56) References Cited

U.S. PATENT DOCUMENTS

| | | |
|---|---|---|
| 8,351,929 B2 | 1/2013 | Izawa et al. |
| 8,406,756 B1 | 3/2013 | Reeves et al. |
| 8,406,757 B1 | 3/2013 | Singh et al. |
| 8,504,021 B1 | 8/2013 | Blinn et al. |
| 9,351,148 B2 | 5/2016 | Sparks et al. |
| 9,351,253 B2 | 5/2016 | Chhabra et al. |
| 9,432,924 B1 | 8/2016 | Singh et al. |
| 9,668,203 B2 | 5/2017 | Zhang et al. |
| 9,832,678 B1 | 11/2017 | Tandon et al. |
| 9,900,765 B2 | 2/2018 | Gonzalez et al. |
| 10,194,308 B2 | 1/2019 | Lu et al. |
| 10,812,975 B1 | 10/2020 | Easwar Prasad et al. |
| 11,412,386 B2 | 8/2022 | Shaw et al. |
| 11,641,585 B2 | 5/2023 | Shaw et al. |
| 11,722,963 B2 | 8/2023 | Mcgill et al. |
| 2010/0188684 A1* | 7/2010 | Kumara ............... G06F 21/608 |
| | | 358/1.14 |
| 2011/0179076 A1* | 7/2011 | Ishizuka ............ G06F 16/9535 |
| | | 707/769 |
| 2014/0298271 A1* | 10/2014 | Jakubiak ............ G06F 3/04812 |
| | | 715/856 |
| 2015/0348496 A1* | 12/2015 | Santos, II ............ G06F 9/4451 |
| | | 345/520 |
| 2016/0345246 A1* | 11/2016 | Xing ..................... H04W 8/005 |
| 2019/0339905 A1* | 11/2019 | Mizuno ................ G06F 3/0659 |
| 2020/0045519 A1* | 2/2020 | Raleigh .................... H04W 4/08 |
| 2022/0295260 A1* | 9/2022 | Yamine .................... H04W 8/00 |
| 2022/0383151 A1 | 12/2022 | Zeng et al. |
| 2024/0064503 A1 | 2/2024 | Sihotang et al. |
| 2024/0073671 A1 | 2/2024 | Sood |
| 2024/0073784 A1 | 2/2024 | Sood |
| 2024/0323826 A1 | 9/2024 | Karapantelakis et al. |

FOREIGN PATENT DOCUMENTS

| | | |
|---|---|---|
| CN | 111565477 A | 8/2020 |
| DE | 102008048904 B4 | 7/2014 |
| DE | 102016117530 B4 | 6/2020 |
| EP | 1330894 A2 | 7/2003 |
| EP | 1858200 B1 | 10/2009 |
| EP | 3437379 B1 | 4/2022 |
| JP | 4037646 B2 | 11/2007 |
| KR | 100453234 B1 | 10/2004 |
| KR | 20060023359 A | 3/2006 |
| KR | 20140112916 A | 9/2014 |
| KR | 101783613 B1 | 10/2017 |
| WO | 2013103511 A1 | 7/2013 |
| WO | 2015130203 A1 | 9/2015 |
| WO | 2018000560 A1 | 1/2018 |

* cited by examiner

SYSTEM AND METHODS FOR CONTROLLING WIRELESS DEVICE FUNCTIONALITY WHEN CONNECTED TO ROAMING NETWORKS

BACKGROUND

Roaming is a wireless telecommunication term typically used with mobile devices, such as mobile phones. It refers to a mobile phone being used outside the range of its native network and connecting to another available cell network. In more technical terms, roaming refers to the ability for a cellular customer to automatically make and receive voice calls, send and receive data, or access other services, including home data services, when traveling outside the geographical coverage area of the home network, by means of using a visited network. For example: should a subscriber travel beyond their cell phone company's transmitter range, their cell phone would automatically hop onto another phone company's service, if available.

BRIEF DESCRIPTION OF THE DRAWINGS

Detailed descriptions of implementations of the present invention will be described and explained through the use of the accompanying drawings.

Figure 1:
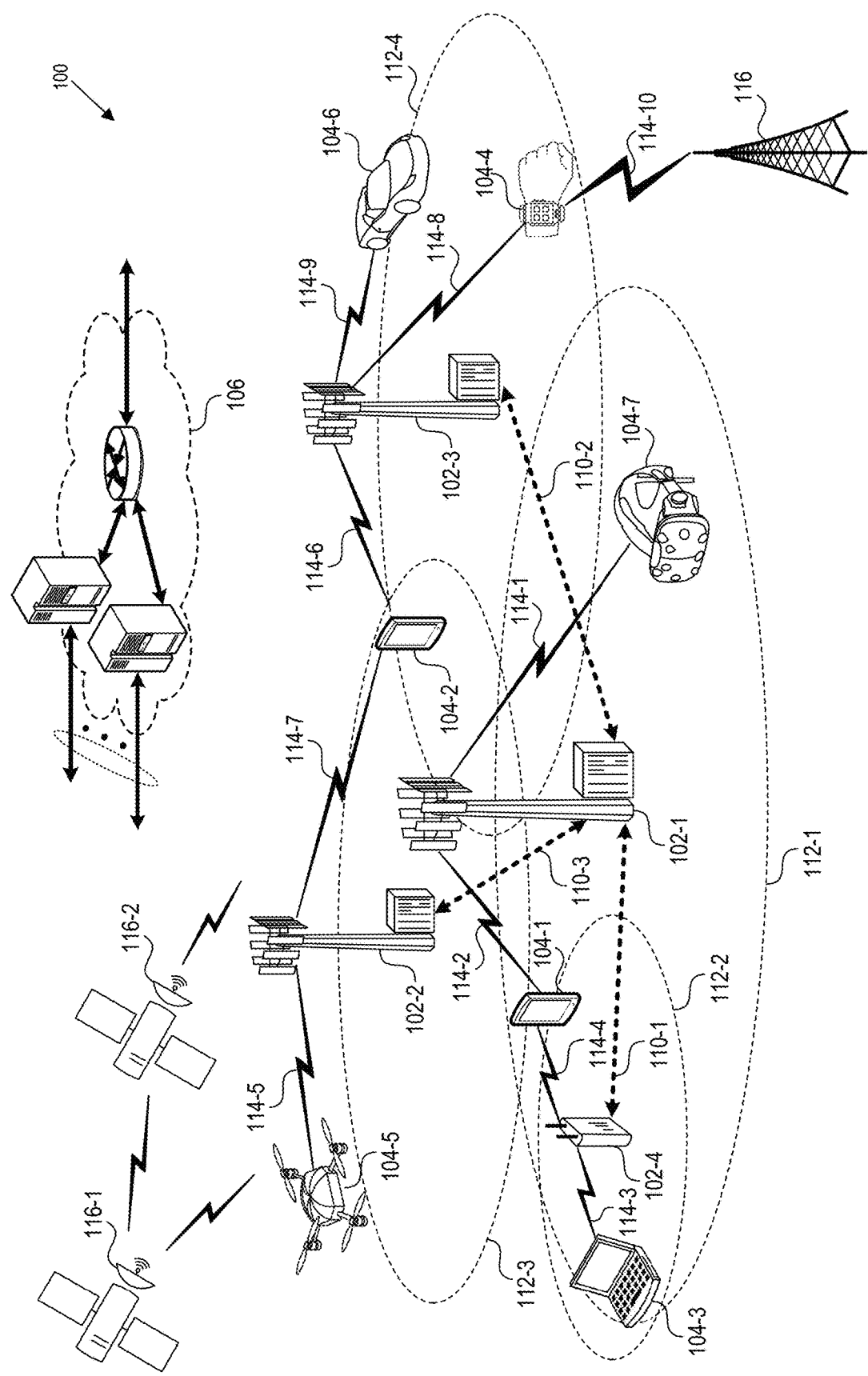
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a system for controlling data usage and saving the battery life of a wireless device connected to a roaming telecommunications network (roaming network). A roaming network functions similarly to the telecommunications network to which the wireless device is subscribed. A roaming network is a separate network owned and/or operated by an entity different from the telecommunications company operating the telecommunications network to which the wireless device is subscribed. Therefore, for the wireless device to access a roaming network, an agreement is in place between the roaming network and the telecommunications network. The agreements allow a wireless device to access a roaming network in exchange for the telecommunications company paying the roaming network operator. The agreements can cause the telecommunications company to pay the roaming network operator a set fee per megabyte (MB) of data the wireless device uses when connected to the roaming network.

Wireless devices perform many background tasks that require large amounts of data. Background tasks can be the framework used to keep your app content up to date and/or run tasks requiring minutes to complete while your app is operating in the background. Some tasks can optionally require external power and network connectivity. For example, a background task can be an email application constantly sending a request to the telecommunications network to see if a new email has been received or an application store automatically updating an application when a new update is released. These background tasks cause the wireless device to use high amounts of data without user input, leading to increased costs for the telecommunications network. Additionally, these background tasks can reduce the battery life of the wireless device. Because a roaming network can be located outside of the range of the telecommunications network in a location where the wireless device is not typically located, a user will typically use the wireless device more, causing the battery of the wireless device to drain more quickly. The background tasks contribute to the speed at which the battery life of the wireless device is drained, leading to the user being stranded in an unfamiliar location.

The disclosed technology controls the amount of data used by the wireless device and optimizes the battery usage of the wireless device when the wireless device connects to a roaming network. The wireless device receives a list of roaming networks from the telecommunications network. The list of roaming networks can indicate to the wireless device when the wireless device is connected to a roaming network and what agreement is in place with the roaming network. When the wireless device connects to a roaming network, the wireless device can automatically enter a roaming mode. The roaming mode setting can be installed onto a wireless device through carrier updates or come preinstalled on the wireless device. The roaming mode can activate the wireless device's low data mode, low power mode settings, and/or any setting that can conserve data and power. Low data mode and low power mode are two conventional modes native to the wireless device that currently comes preinstalled on many wireless devices by the wireless device manufacturer. The Low data mode and low power mode, though, must be manually turned on by a user of the wireless device. Low data mode reduces data usage by limiting background tasks and pausing automatic updates and tasks when the device is not connected to Wi-Fi. When in low data mode, applications can be prevented from using network data when not in the foreground, and streaming content quality may be reduced. Automatic downloads and backups may also be turned off. Low power mode also reduces power usage by optimizing performance for essential tasks like making calls, sending messages, and accessing the internet. Low power mode can also limit the display refresh rate of the wireless device, reduce CPU and GPU performance, and limit 5G capabilities for specific applications. In some embodiments, a notification is generated that indicates that the wireless device is in roaming mode. Roaming mode can reduce data usage and conserve battery life by preventing the wireless device from performing background tasks. The roaming mode can exclude essential background tasks related to receiving calls or text messages or updating the global positioning system (GPS) location. The wireless device exits roaming mode and returns to a standard mode when the wireless device disconnects from the roaming network and reconnects to the telecommunications network. By causing the wireless device to enter roaming mode, the telecommunications network reduces costs while simultaneously extending the battery life of the wireless device.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs, including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
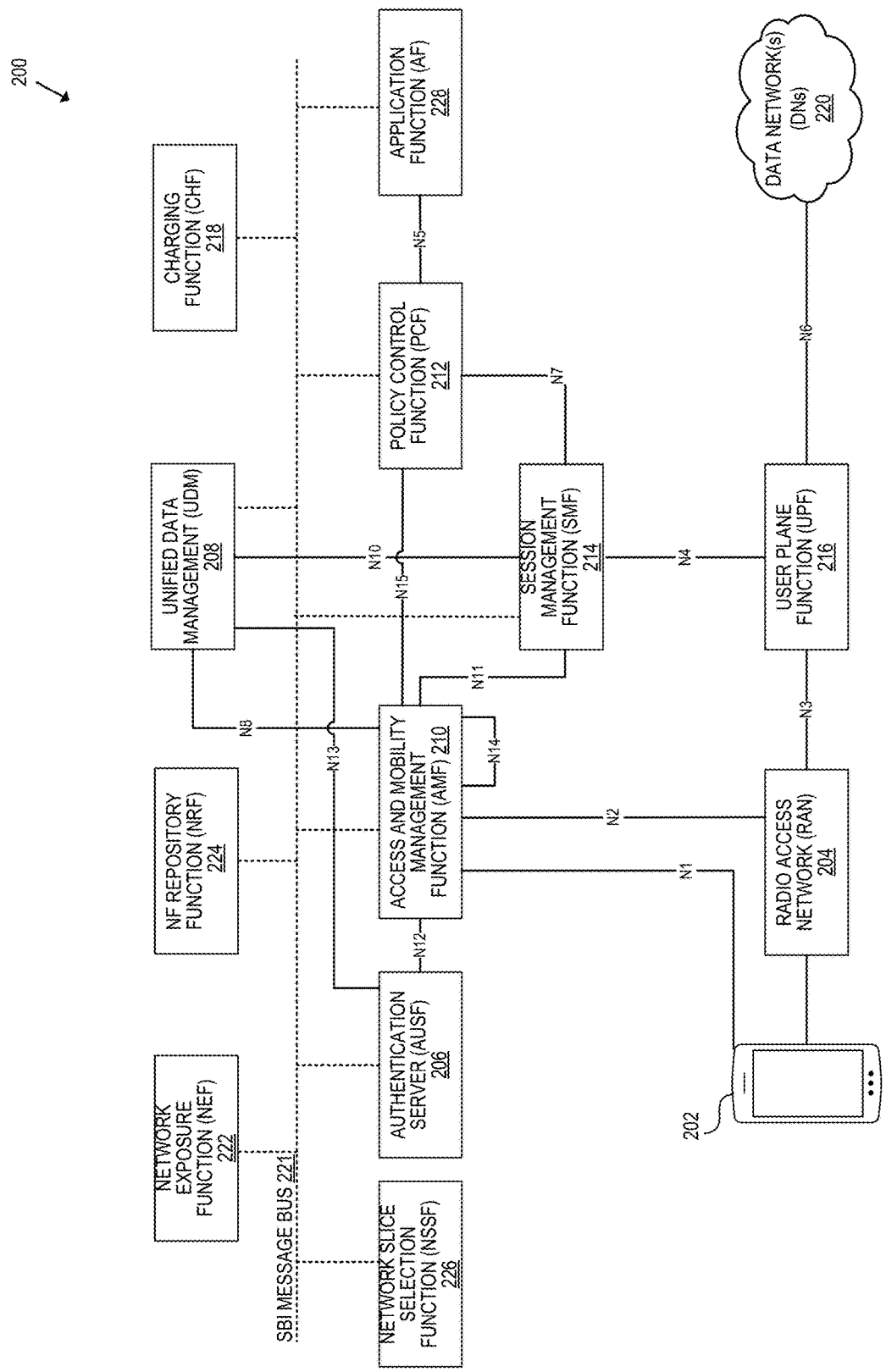
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Roaming Mode

Figure 3:
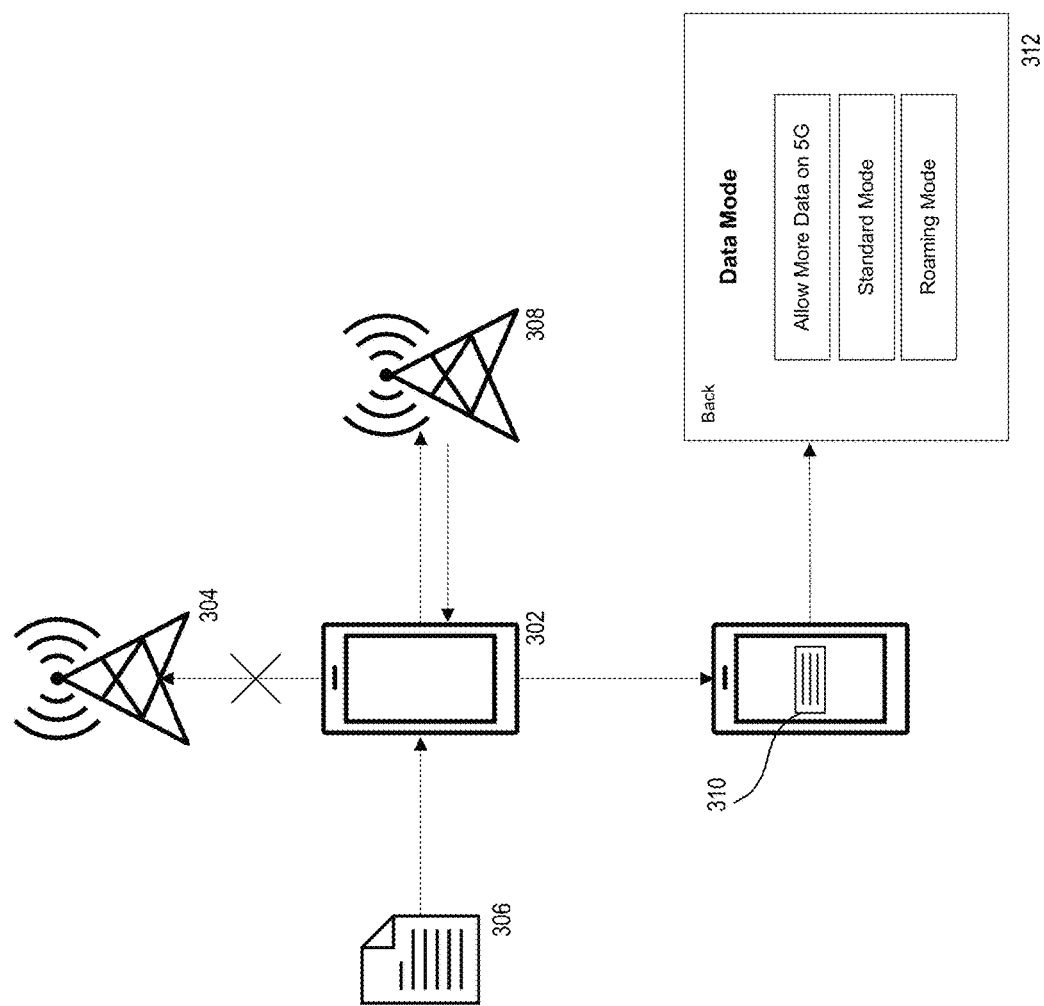
FIG. 3 is an illustration of an embodiment of the system.

FIG. 3 is an illustration of an embodiment of the system, when the system is located on the wireless device. A wireless device 302 receives a list of roaming networks 306. The list of roaming networks 306 can be periodically sent to the wireless device 302 to enable updates or changes to the list of roaming networks 306. For example, an update can be the removal of a roaming network or the addition of a roaming network. The list of roaming networks 306 can be sent, for example, when the wireless device 302 connects to the wireless network, sent by the roaming network, or sent at predetermined intervals such as once a day, week, or month. In some embodiments, the list of roaming networks 306 includes data related to each roaming network that controls a roaming mode level that the wireless device enters into when the wireless device connects to a roaming network. The roaming mode level can dictate how much data the wireless device uses or how much the battery life of the wireless device is optimized when compared to the standard mode. For example, a high roaming mode level can cause the wireless device to enter into both low data mode and low power mode for all applications, while a low roaming mode level can cause the wireless device to enter either low data mode or low power mode for only nonessential applications. The roaming mode level can activate the native low data mode and/or low power mode settings or modify the settings of the wireless device in a similar manner to activating the low data mode or low power mode settings. The roaming mode level can be determined by an agreement between the telecommunications network and the roaming network. In some embodiments, the roaming mode level is determined by activity data generated by the wireless device. Activity data includes a subscriber's or wireless device's 302 interactions with the telecommunications network, such as what applications the wireless device 302 uses or the amount of data the wireless device 302 uses on the telecommunications network. The activity data can indicate that the wireless device 302 frequently uses a certain application or interacts with the telecommunications network in a certain way; the list of roaming networks 306 can be updated to account for this interaction. For example, the application can be noted as exempt from roaming mode or be allowed on some roaming networks but not others.

The wireless device 302 can connect to the roaming network 308 and disconnect from the telecommunications network 304. When connected to the telecommunications network 304, the wireless device can be in a standard mode. The standard mode can be the default mode of the wireless device, such as a default mode set by the manufacturer of the wireless device, that allows the wireless device to perform background tasks. Additionally, the standard mode can place the wireless device into a standard battery mode that balances performance with battery life experience to optimize the user experience of the wireless device. The wireless device 302 connects to the roaming network when the wireless device 302 is no longer in range of the telecommunications network 304. The roaming network 308 can have an agreement with the telecommunications network 304 to allow the wireless device 302 to access the roaming network 308. Due to the roaming network's 308 high data cost and/or remoteness, the wireless device 302 enters a roaming mode when connected to the roaming network 308. The roaming mode can cause a notification 310 to be generated on the wireless device 302. The notification 310 can indicate to the user of the wireless device 302 that the roaming mode is activated and/or the roaming mode level. The notification 310 can include a selection box or button allowing the user to opt in or out of the roaming mode. In some embodiments, the notification 310 directs the user to a settings page 312. The settings page 312 is a submenu of the native setting application on the wireless device 302. The settings page 312 can allow the user to toggle between multiple data mode settings. The user can choose between faster connectivity, such as by using more data on 5G, a standard setting, or roaming mode.

Entering roaming mode can cause the wireless device 302 to reduce an amount of greenhouse gases. Every year, approximately 40 billion tons of $CO_2$ are emitted worldwide. Power consumption by digital technologies, including telecommunications networks, accounts for approximately 4% of this figure. Further, conventional networks can sometimes exacerbate the causes of climate change. For example, the average U.S. power plant expends approximately 600 grams of carbon dioxide for every kWh generated. Therefore, roaming mode can reduce the amount of greenhouse gases by consuming less energy and requiring less frequent charging, which reduces the amount of energy a power plant must produce.

Moreover, in the U.S., data centers are responsible for approximately 2% of the country's electricity use, while globally, they account for approximately 200 terawatt hours (TWh). Transferring 1 GB of data can produce approximately 3 kg of CO2. Each GB of data downloaded thus results in approximately 3 kg of CO2 emissions or other greenhouse gas emissions. The storage of 100 GB of data in the cloud every year produces approximately 0.2 tons of CO2 or other greenhouse gas emissions. Causing the wireless device to enter roaming mode reduces the wireless device's interactions with the telecommunications network and, therefore, data centers. Therefore, the telecommunications network and data centers produce less greenhouse gas due to the transfer of less data to the wireless device.

In some other embodiments, the system is located on the telecommunications network 304. The system causes the wireless device 302 to enter roaming mode when the wireless device 302 disconnects from the telecommunications network. The system then causes the wireless device 302 to enter standard mode when the wireless device 302 reconnects to the telecommunications network 304.

Figure 4:
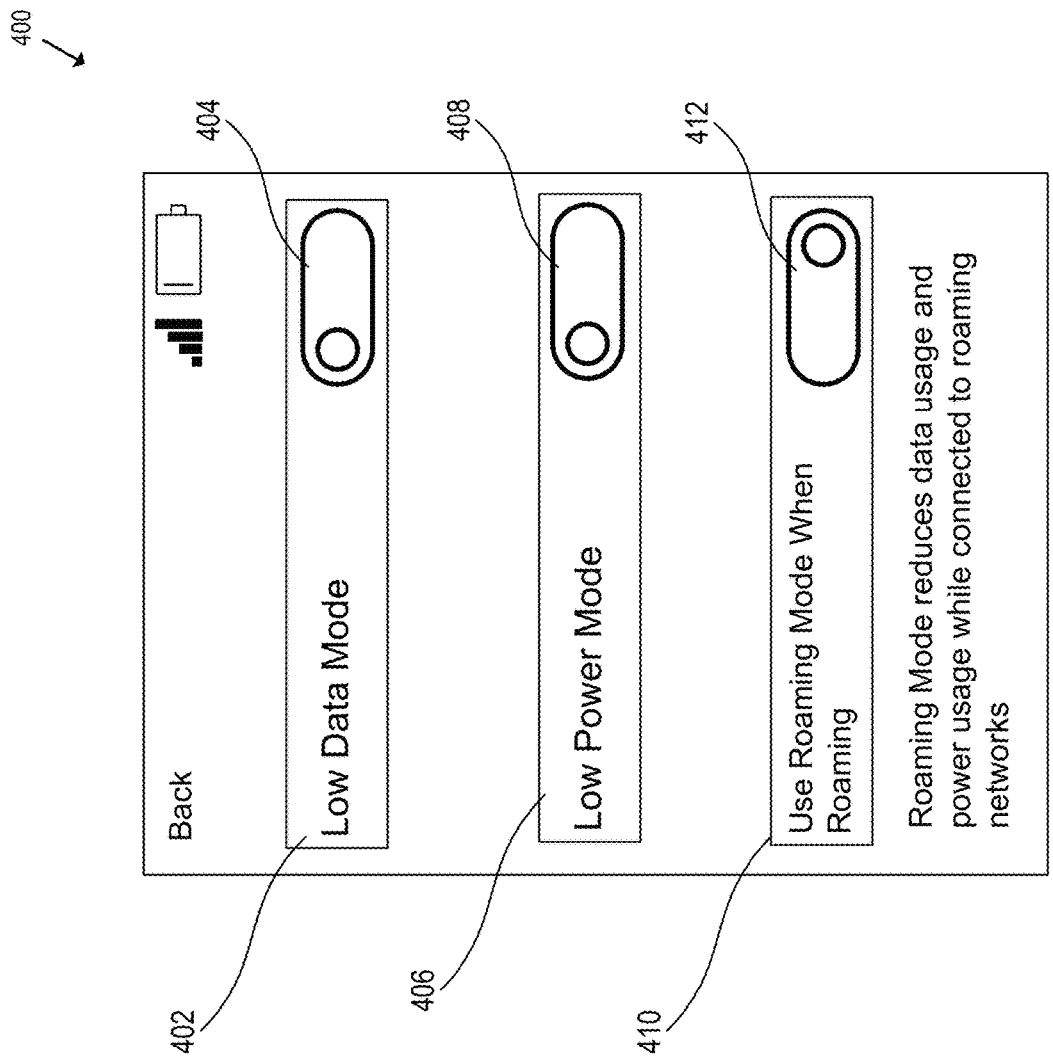
FIG. 4 is an illustration of an embodiment of a settings page of the wireless device.

FIG. 4 is an illustration of an embodiment of a settings page 400 of the wireless device. The settings page 400 can allow a user to toggle between different settings that control the data usage and/or power usage of the wireless device. The settings page can include the current low data mode setting 402 and low power mode setting 406 and the roaming mode setting 410.

The settings page can include a low data mode setting 402 and the corresponding toggle switch 404. The low data mode setting 402 is a setting that is currently present on many wireless devices. The toggle switch 404 enables a user to turn on and off the low data mode setting 402. The low data mode setting 402 helps reduce cellular data usage of the wireless device by pausing automatic updates, downloads, and background tasks. For example, the low data mode setting 402 can prevent the wireless device from downloading music, movies, television shows, or podcasts. When the roaming mode setting 410 activates the low data mode setting 402, the low data mode setting 402 can pause updates and background tasks for all applications on the wireless device, for nonessential applications, for applications chosen by the user, for applications chosen by the telecommunications company, or for a threshold number of the highest data usage applications on the wireless device.

The settings page 400 can include a low power mode setting 406 and the corresponding toggle switch 408. The low power mode setting 406 is a setting that is currently present on many wireless devices. The toggle switch 408 enables a user to turn on and off the low power mode setting 406. The low power mode setting 406 can temporarily reduce background activity like downloads and mail retrieval until the wireless device is fully charged. When the roaming mode setting 410 activates the low power mode setting 406, the low power mode setting 406 can pause background activity for tasks for all applications on the wireless device, for nonessential applications, for applications chosen by the user, for applications chosen by the telecommunications company, or for a threshold number of the highest battery usage applications on the wireless device.

The setting page 400 can include a roaming mode setting 410 and the corresponding toggle switch 412. The toggle switch 412 enables a user to turn on and off the roaming mode setting 410. The toggle switch 412 can either cause the roaming mode setting 410 to activate when the wireless device connects to a roaming network or cause the wireless device to enter roaming mode even when the wireless device is not connected to a roaming network. The roaming mode setting 410 can enable the low data mode setting 402, the low power mode setting 406, or any setting capable of limiting the data usage and/or power usage of the wireless device. The roaming mode setting 410 can be activated when the wireless device connects to a roaming network. The roaming mode setting can be enabled for all applications on the wireless device, for nonessential applications, for applications chosen by the user, for applications chosen by the telecommunications company, or for a threshold number of the highest battery usage applications on the wireless device.

Figure 5:
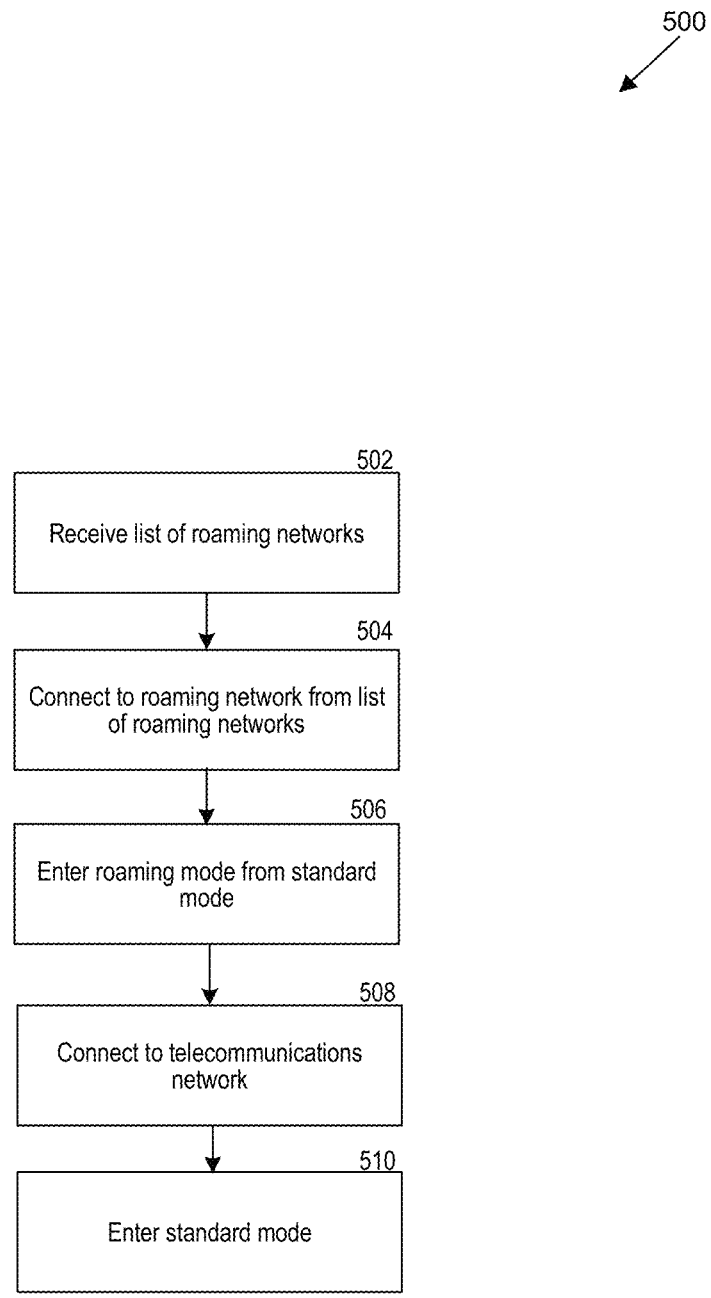
FIG. 5 is a flow chart that illustrates an embodiment of the system.

FIG. 5 is a flowchart that illustrates an embodiment of the system. In one example, the system can be embodied in a computer system, the system including at least one hardware processor and at least one non-transitory memory storing instructions, which, when executed by the at least one hardware processor, cause the system to perform the process 500.

At step 502, the system is a wireless device and receives, from a telecommunications network subscribed to by the wireless device, a list of roaming networks. The list of roaming networks includes at least one roaming network that the wireless device is configured to connect to. At step 504, the system connects to a roaming network from the list of roaming networks. In some embodiments, the system can determine a geographical area the wireless device is located in when the wireless device connects to the roaming network. The system can determine a list of authorized applications based on the geographical location. Background tasks are enabled for an authorized application when the wireless device enters the roaming mode.

At step 506, the system enters a roaming mode from a standard mode. The roaming mode reduces an amount of data used by the wireless device by preventing the wireless device from performing background tasks. Background tasks include processes performed by the wireless device to keep an application on the wireless device up to date. The standard mode causes the wireless device to operate at a higher data level and a less optimized battery level compared to the roaming mode. In some embodiments, the system can generate a notification indicating that the wireless device has entered the roaming mode. The system can generate a selectable box enabling a user of the wireless device to enable the standard data mode when connected to the roaming network.

In some other embodiments, the system can receive a list of roaming mode levels assigned to each roaming network on the list of roaming networks. A higher roaming mode level enables the wireless device to perform a higher number of background tasks in comparison to a lower roaming mode level. The system can determine which roaming network from the list of roaming networks the wireless device is connected to. The system can determine the roaming mode level from the list of roaming mode levels that corresponds with the determined roaming network. The system can enter the roaming mode level associated with the roaming network the wireless device is connected to. The system can disconnect from the roaming network. The system can connect to a second roaming network from the list of roaming networks. The system can update the roaming mode level based on the list of roaming mode levels. The system can enter the roaming mode level associated with the second roaming network.

In some other embodiments, the system can enter a low power mode when the wireless device enters roaming mode. The low power mode optimizes battery performance of the wireless device to extend a battery life of the wireless device. In some embodiments, greenhouse gases are reduced when the wireless device enters roaming mode because the wireless device consumes less energy due to using less data and because the roaming network consumes less energy due to supplying less data to the wireless device in order to maintain the background tasks. At step 508, the system connects to the telecommunications network. The wireless device disconnects from the roaming network before connecting to the telecommunications network subscribed to by the wireless device. At step 510, the system enters the standard mode.

In some other embodiments, the system is located on a telecommunications network. The system can transmit, to a wireless device subscribed to a telecommunications network, a list of roaming networks. The list of roaming networks includes at least one roaming network that the wireless device is configured to connect to. In some embodiments, the system can assign a roaming mode level to each roaming network on the list of roaming networks. The roaming mode level determines an amount of background tasks the wireless device is allowed to perform and a degree to which the battery performance of the wireless device is optimized. The system can cause the wireless device to determine the roaming mode level of the roaming network the wireless device is connected to. The system can cause the wireless device to adjust the roaming mode to the determined roaming mode level.

The system can cause the wireless device to enter a roaming mode when the wireless device disconnects from the telecommunications network and connects to a roaming network from the list of roaming networks. The roaming mode causes the wireless device to activate a low data mode and a low power mode. The low data mode prevents the wireless device from performing background tasks. The low power mode optimizes battery performance of the wireless device to extend a battery life of the wireless device.

In some embodiments, the list of roaming networks causes the wireless device to generate a notification indicating that the wireless device has entered the roaming mode. In some other embodiments, the wireless device updates the roaming mode level when the wireless device connects to a second roaming network. In some other embodiments, the roaming mode level causes the wireless device to enter into either low data mode or low power mode. The system can cause the wireless device to reenter a standard data mode when the wireless device reconnects to the telecommunications network. The standard mode causes the wireless device to operate at a higher data level and a less optimized battery level compared to the roaming mode.

Computer System

Figure 6:
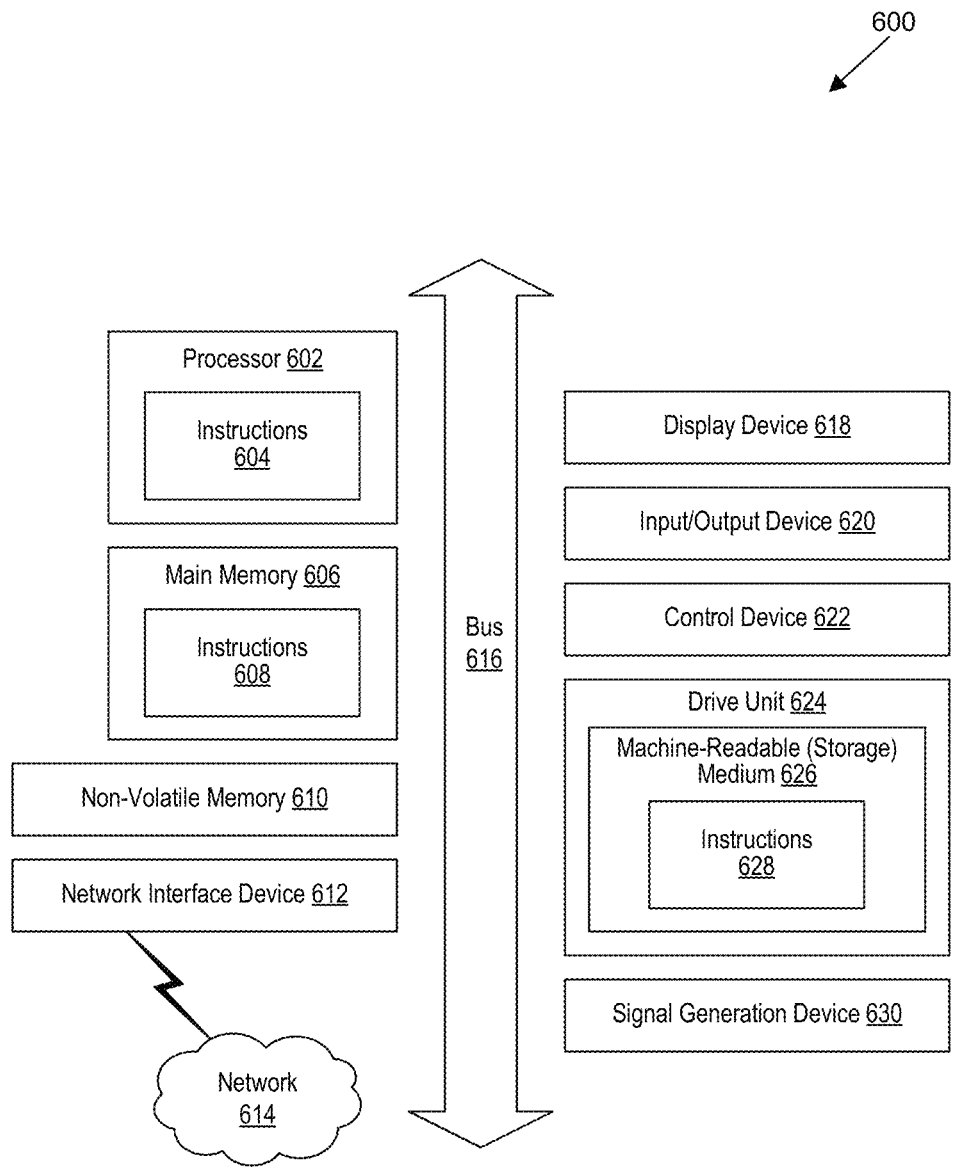
FIG. 6 is a block diagram that illustrates components of a computing device.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A wireless device comprising:
   at least one hardware processor; and
   at least one non-transitory memory storing instructions, which, when executed by the at least one hardware processor, cause the wireless device to:
      receive, from a telecommunications network subscribed to by the wireless device, a list of roaming networks,
         wherein the list of roaming networks includes at least one roaming network that the wireless device is configured to connect to;
      connect to a roaming network from the list of roaming networks;
      enter a roaming mode from a standard mode,
         wherein the roaming mode reduces an amount of data used by the wireless device by preventing the wireless device from performing background tasks,
         wherein background tasks include processes performed by the wireless device to keep an application on the wireless device up to date, and wherein the standard mode causes the wireless device to operate at a higher data level and a less optimized battery level compared to the roaming mode;
generate a display of a notification enabling a user to cause the wireless device to enter the standard data mode when connected to the roaming network;
connect to the telecommunications network,
  wherein the wireless device disconnects from the roaming network before connecting to the telecommunications network subscribed to by the wireless device; and
re-enter the standard mode from the roaming mode in response to the wireless device being connected to the telecommunications network.

2. The wireless device of claim 1, further caused to:
generate a notification indicating that the wireless device has entered the roaming mode.

3. The wireless device of claim 1, further caused to:
receive a list of roaming mode levels assigned to each roaming network on the list of roaming networks,
  wherein a higher roaming mode level enables the wireless device to perform a higher number of background tasks in comparison to a lower roaming mode level;
determine which roaming network from the list of roaming networks the wireless device is connected to;
determine the roaming mode level from the list of roaming mode levels that corresponds with the determined roaming network; and
enter the roaming mode level associated with the roaming network the wireless device is connected to.

4. The wireless device of claim 3, further caused to;
disconnect from the roaming network;
connect to a second roaming network from the list of roaming networks;
update the roaming mode level based on the list of roaming mode levels; and
enter the roaming mode level associated with the second roaming network.

5. The wireless device of claim 1, further caused to:
determine a geographical area the wireless device is located in when the wireless device connects to the roaming network; and
determine a list of authorized applications based on the geographical location,
  wherein background tasks are enabled for an authorized application when the wireless device enters the roaming mode.

6. The wireless device of claim 1, further caused to:
enter a low power mode when the wireless device enters roaming mode,
  wherein the low power mode optimizes battery performance of the wireless device to extend a battery life of the wireless device.

7. The wireless device of claim 1, wherein greenhouse gases are reduced when the wireless device enters roaming mode because the wireless device consumes less energy due to using less data and because the roaming network consumes less energy due to supplying less data to the wireless device in order to maintain the background tasks.

8. A method comprising:
transmitting, to a wireless device subscribed to a telecommunications network, a list of roaming networks,
  wherein the list of roaming networks includes at least one roaming network that the wireless device is configured to connect to;
causing the wireless device to enter a roaming mode when the wireless device disconnects from the telecommunications network and connects to a roaming network from the list of roaming networks,
  wherein the roaming mode causes the wireless device to activate a low data mode and a low power mode,
  wherein the low data mode prevents the wireless device from performing background tasks, and
  wherein the low power mode optimizes battery performance of the wireless device to extend a battery life of the wireless device;
causing the wireless device to generate a display of a notification enabling a user to cause the wireless device to enter a standard data mode when connected to the roaming network; and
causing the wireless device to re-enter the standard data mode in response to the wireless device reconnecting to the telecommunications network,
  wherein the standard mode causes the wireless device to operate at a higher data level and a less optimized battery level compared to the roaming mode.

9. The method of claim 8, wherein the list of roaming networks causes the wireless device to generate a notification indicating that the wireless device has entered the roaming mode.

10. The method of claim 8, further comprising:
assigning a roaming mode level to each roaming network on the list of roaming networks,
  wherein the roaming mode level determines an amount of background tasks the wireless device is allowed to perform and a degree to which the battery performance of the wireless device is optimized;
causing the wireless device to determine the roaming mode level of the roaming network the wireless device is connected to; and
causing the wireless device to adjust the roaming mode to the determined roaming mode level.

11. The method of claim 10, wherein the wireless device updates the roaming mode level when the wireless device connects to a second roaming network.

12. The method of claim 10, wherein the roaming mode level causes the wireless device to enter into either low data mode or low power mode.

13. The method of claim 8, further comprising
determining a geographical area the wireless device is located in when the wireless device connects to the roaming network; and
determining a list of authorized applications based on a geographical location,
  wherein background tasks are enabled for an authorized application when the wireless device enters the roaming mode.

14. A non-transitory, computer-readable storage medium comprising instructions recorded thereon, wherein the instructions, when executed by at least one data processor of a system, cause the system to:
receive, from a telecommunications network subscribed to by a wireless device, a list of roaming networks,
connect to a roaming network from the list of roaming networks;
enter a roaming mode from a standard mode,
  wherein the roaming mode reduces an amount of data used by the wireless device by preventing the wireless device from performing background tasks,
  wherein background tasks include processes performed by the wireless device to keep an application on the wireless device up to date, and wherein the standard mode causes the wireless device to operate at a higher data level and a less optimized battery level compared to the roaming mode;

generate a display of a notification enabling a user to cause the wireless device to enter the standard data mode when connected to the roaming network; and re-enter the standard mode in response to the system disconnecting from the roaming network.

15. The non-transitory, computer-readable storage medium of claim 14, further caused to:

generate a notification indicating that the wireless device has entered the roaming mode.

16. The non-transitory, computer-readable storage medium of claim 14, further caused to:

receive a list of roaming mode levels assigned to each roaming network on the list of roaming networks,
wherein a higher roaming mode level enables the wireless device to perform a higher number of background tasks in comparison to a lower roaming mode level;

determine which roaming network from the list of roaming networks the wireless device is connected to;

determine the roaming mode level from the list of roaming mode levels that corresponds to the determined roaming network; and enter the roaming mode level associated with the roaming network the wireless device is connected to.

17. The non-transitory, computer-readable storage medium of claim 14, further caused to;

disconnect from the roaming network;

connect to a second roaming network from the list of roaming networks;

update the roaming mode level based on the list of roaming mode levels; and enter the roaming mode level associated with the second roaming network.

18. The non-transitory, computer-readable storage medium of claim 14, further caused to:

determine a geographical area the wireless device is located in when the wireless device connects to the roaming network; and determine a list of authorized applications based on the geographical location,
wherein background tasks are enabled for an authorized application when the wireless device enters the roaming mode.

19. The non-transitory, computer-readable storage medium of claim 14, further caused to:

enter a low power mode when the wireless device enters roaming mode,
wherein the low power mode optimizes battery performance of the wireless device to extend a battery life of the wireless device.

20. The non-transitory, computer-readable storage medium of claim 14, further caused to:

enter a low data mode when the wireless device enters roaming mode;
wherein the low data mode prevents the wireless device from performing background tasks.

* * * * *